US012638054B2

(12) United States Patent
Zeman

(10) Patent No.: US 12,638,054 B2
(45) Date of Patent: May 26, 2026

(54) DEVICE AND METHOD FOR MOUNTING A BEARING ON A SEATING

(71) Applicant: SKF Australia Pty Ltd, Oakleigh (AU)

(72) Inventor: George Zeman, Hornsby (AU)

(73) Assignee: SKF Australia Pty Ltd, Oakleigh (AU)

( * ) Notice: Subject to any disclaimer, the term of this patent is extended or adjusted under 35 U.S.C. 154(b) by 0 days.

(21) Appl. No.: 18/942,708

(22) Filed: Nov. 10, 2024

(65) Prior Publication Data

US 2025/0163967 A1     May 22, 2025

(30) Foreign Application Priority Data

Nov. 17, 2023   (DE) ......................... 102023211460.7
Dec. 4, 2023    (DE) ......................... 102023212174.3

(51) Int. Cl.
  *F16C 23/08*      (2006.01)
  *F16C 35/078*     (2006.01)
(52) U.S. Cl.
  CPC .......... *F16C 35/078* (2013.01); *F16C 23/086* (2013.01); *F16C 2226/16* (2013.01); *F16C 2226/60* (2013.01); *Y10T 29/49696* (2015.01)
(58) Field of Classification Search
  CPC ...... F16C 23/086; F16C 35/078; F16C 43/04; F16C 2226/16; F16C 2226/60; Y10T 29/49696
  See application file for complete search history.

(56) References Cited

U.S. PATENT DOCUMENTS

| | | | | | |
|---|---|---|---|---|---|
| 5,685,068 | A | * | 11/1997 | Bankestrom | ............ F16D 1/092 |
| | | | | | 29/898.07 |
| 5,779,419 | A | * | 7/1998 | Kellstrom | ............. F16C 35/073 |
| | | | | | 411/14 |
| 2008/0075402 | A1 | * | 3/2008 | Hewitt | .................. F16C 35/073 |
| | | | | | 384/538 |

FOREIGN PATENT DOCUMENTS

| | | | | | | |
|---|---|---|---|---|---|---|
| BR | 102016001988 | A2 | * | 8/2016 | ........... | F16C 35/063 |
| DE | 19963109 | A1 | * | 7/2001 | ........... | F16C 35/063 |
| DE | 102013204848 | A1 | * | 9/2014 | ........... | F16C 35/078 |
| EP | 0742376 | A1 | * | 11/1996 | ........... | F16C 35/078 |
| EP | 0878271 | A2 | * | 11/1998 | ........... | F16C 35/078 |
| FR | 3028582 | A1 | * | 5/2016 | ........... | F16C 35/073 |
| GB | 2540330 | A | * | 1/2017 | ........... | F16C 35/078 |
| JP | 2000205287 | A | * | 7/2000 | ........... | F16C 35/073 |

* cited by examiner

*Primary Examiner* — Phillip A Johnson
(74) *Attorney, Agent, or Firm* — J-TEK LAW PLLC; Jeffrey D. Tekanic; Scott T. Wakeman

(57) ABSTRACT

A toolkit for mounting a bearing onto a seating includes an adapter sleeve radially interposable between the inner ring and the seating and having a tapered portion configured to mate with a tapered bore of the inner ring and a threaded portion configured to extend away from the bearing, a hydraulic nut having a threaded bore and an axially moveable piston, a hydraulic pump configured to increase a hydraulic pressure inside the hydraulic nut, a driving tube configured to be interposed axially between the side face of the inner ring of the bearing and the piston, and a reaction sleeve configured to be interposed between the hydraulic nut and the adapter sleeve and including a first threaded portion configured to engage the threaded portion of the adapter sleeve and a second threaded portion configured to engage the threaded bore of the hydraulic nut. Also a method of using the toolkit.

11 Claims, 2 Drawing Sheets

DEVICE AND METHOD FOR MOUNTING A BEARING ON A SEATING

CROSS-REFERENCE

This application claims priority to German patent application no. 10 2023 211 460.7 filed on Nov. 17, 2024, and to German patent application no. 10 2023 212 174.3 filed on Dec. 4, 2024, the contents of which are fully incorporated herein by reference.

TECHNOLOGICAL FIELD

The disclosure is directed to a method and apparatus for mounting a bearing with an inner ring having a tapered bore, in particular a spherical roller bearing or a toroidal roller bearing, on a seating.

BACKGROUND

A conventional method for mounting a rolling bearing having a tapered bore (that is, the bore of the inner ring of the bearing has a tapered surface) on a seating may be referred to as the "SKF Drive-Up Method."

According to this method, as illustrated on FIG. 1, a hydraulic nut 13 and an adapter sleeve 8 are used to install a spherical roller bearing 1. The adapter sleeve comprises, on its outer peripheral surface, a portion 11 which is tapered so it can mate with the tapered surface 6 of the bearing bore. The adapter sleeve 8 also comprises a threaded portion 12 for engaging with a threaded portion 14 arranged in the bore of the nut. A hydraulic pump 24 with a pressure gauge 25 having a high accuracy is used to build a pressure inside the nut for axially driving a piston 15 against a side surface of the bearing inner ring. A specific pressure calculated for each bearing type enables accurate positioning of the bearing at a starting point from which the axial drive-up is measured using a dial indicator 26. By controlling the axial drive-up from this predetermined starting position, an appropriate fit can be achieved.

In certain applications, such as when the bearing is installed inside a housing with a bore through which a shaft extends, there may often not be enough space for the hydraulic nut to engage inside the housing bore up until reaching the bearing.

SUMMARY

This problem is addressed by embodiments of the present disclosure, an aspect of which is to provide a toolkit for mounting a bearing with an inner ring having a tapered bore onto a seating, the mounting being realized with an adapter sleeve, a hydraulic nut and a hydraulic pump.

The adapter sleeve is configured to be radially interposed between the inner ring and the seating. The adapter sleeve comprises, on its outer periphery, a tapered portion for mating with the tapered bore of the inner ring. The adapter sleeve also comprises on its outer periphery a threaded portion configured to extend axially away from the bearing.

The hydraulic nut comprises a threaded bore and a piston, the piston being moveable axially in order to apply an axial force on a side face of the bearing inner ring.

The hydraulic pump is used to build a hydraulic pressure inside the hydraulic nut.

The toolkit according to embodiments of the disclosure also includes a driving tube and a rection sleeve. The driving tube is configured to be interposed axially between the side face of the bearing inner ring and the piston of the hydraulic nut. The reaction sleeve is configured to be interposed between the hydraulic nut and the adapter sleeve. The reaction sleeve comprises a first threaded portion which is to be engaged with the threaded portion of the adapter sleeve. The reaction sleeve also comprises a second threaded portion to be engaged with the threaded bore of the hydraulic nut.

In a preferred embodiment of the invention, the driving tube and the reaction sleeve are made from AISI 4140 alloy steel or similar.

In a preferred embodiment the reaction sleeve comprises a knurled surface located axially between the first threaded portion and the second threaded portion.

In a preferred embodiment, the toolkit also comprises a contact ring which is configured to be interposed axially between the driving tube and the side face of the bearing inner ring. In a preferred embodiment, the contact ring is made from AISI 4140 alloy steel or similar. In a preferred embodiment, the contact ring comprises, on the side to be engaged with the side face of the bearing inner ring, a tapered portion so as to prevent any contact with a seal or a cage or a rolling element of the bearing.

Another aspect of the disclosure is a method to mount a bearing with an inner ring having a tapered bore to a seating using the toolkit according to the invention. The contact ring may be used in some embodiments of the disclosure and omitted from other embodiments of the disclosure.

Another aspect of the disclosure is a system comprising the toolkit of the disclosure mounted on a seating using the method of the disclosure.

BRIEF DESCRIPTION OF THE DRAWINGS

Aspects of the disclosure will now be explained in connection with the attached Figures, wherein.

DETAILED DESCRIPTION

Figure 2:
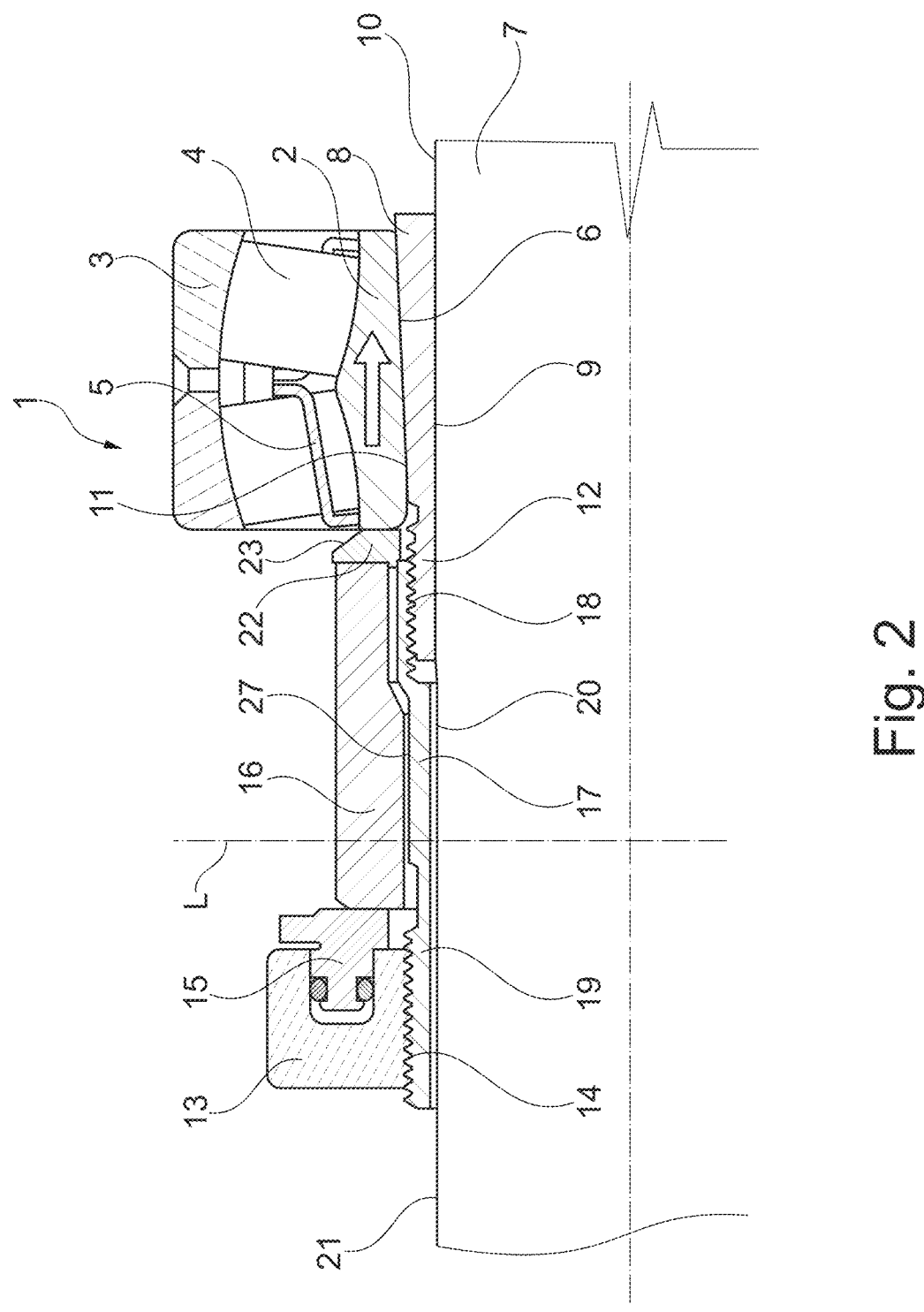
FIG. 2 schematically illustrates a drive-up method using a toolkit according to an embodiment of the present disclosure which toolkit includes some components that are also present in the toolkit of FIG. 1.

FIG. 2 illustrates a bearing 1 being mounted onto a seating 7.

The bearing is a rolling bearing and comprises an inner ring 2, an outer ring 3, rolling elements 4 in the form of spherical rollers and located between the inner and outer rings, and a cage 5 for holding the rollers in position, at a uniform distance in the circumferential direction. The inner ring 2 has a tapered bore 6.

Several elements are used for mounting the bearing 1 onto the seating 7, such as a shaft as illustrated or a sleeve. A first element is an adapter sleeve 8 which is configured to be radially interposed between the inner ring 2 and the seating 7. The adapter sleeve 8 includes, on its outer periphery, a tapered portion 11 for mating with the tapered bore 6 of the bearing inner ring 2. The adapter sleeve 8 further comprises on its outer periphery a threaded portion 12 that extends axially away from the bearing 1. Advantageously, the adapter sleeve 8 has a cylindrical bore 9 configured to make direct contact with a cylindrical surface 10 of the seating 7.

Figure 1:
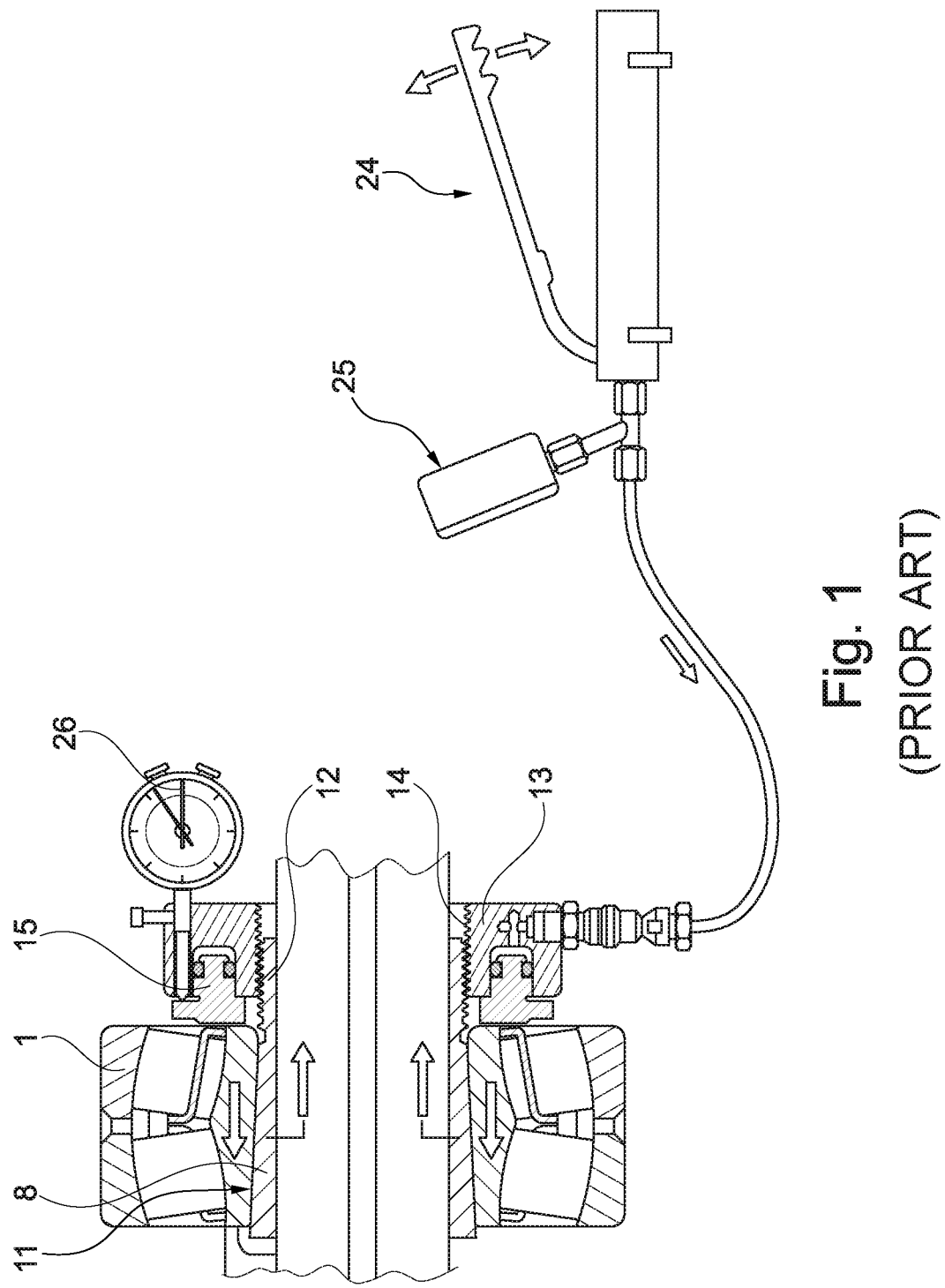
FIG. 1 schematically illustrates a drive-up method using a conventional toolkit.

A second element used is a hydraulic nut 13. The hydraulic nut 13 comprises a threaded bore 14 and a piston 15 moveable axially in order to apply an axial force on a side of the bearing inner ring, the side of the inner ring extending radially. The hydraulic nut 13 also includes a dial indicator, such as the indicator 26 in FIG. 1. A third element used is a hydraulic pump, such as the hydraulic pump 24 of FIG. 1, for building a hydraulic pressure inside the hydraulic nut 13 in order to actuate the piston 15 axially is also used during the mounting of the bearing 1. Advantageously, the pump 24 may be a hand pump having a high accuracy pressure gauge 25.

Further to the elements mentioned above, a toolkit is also used for mounting the bearing. The toolkit comprises a driving tube 16 configured to be interposed axially between the side face of the bearing inner ring 2 and the piston 15 of the hydraulic nut 13. The toolkit also includes a reaction sleeve 17 configured to be to be interposed between the hydraulic nut 13 and the adapter sleeve 8. The reaction sleeve 17 comprises a first threaded portion 18 that is configured to be engaged with the threaded portion 12 of the adapter sleeve 8. The first threaded portion 18 is located on the inner periphery of the reaction sleeve 17.

The reaction sleeve 17 further comprises a second threaded portion 19 to be engaged with the threaded bore 14 of the hydraulic nut 13. The second threaded portion 19 is located on the outer periphery of the reaction sleeve 17. The reaction sleeve is radially interposed between the seating and the driving tube.

Advantageously, the reaction sleeve 17 has a cylindrical bore 20 configured to make direct contact with a cylindrical surface 21 of the seating 7. Advantageously, the reaction sleeve has a knurled surface 27 on its outer periphery. Thanks to its knurled surface, the reaction sleeve can be easily handled. Thanks to the toolkit, the hydraulic nut 13 can remain at a larger axial distance from the bearing 1 than when the toolkit is not used, so as to not interfere with mechanical parts surrounding the bearing such as a housing inside which the bearing is installed.

Thanks to the disclosure, a bearing can be installed inside a housing while keeping the hydraulic nut used to install the bearing outside the housing, as illustrated in FIG. 2 in which the line L represents a side face of the housing base. Thanks to the disclosure, a bearing can replaced in situ, hence reducing drastically the downtime during maintenance.

In a preferred embodiment, the driving tube 16 and the reaction sleeve 17 are made from AISI 4140 alloy steel. Calculations have shown that this material is suitable for properly transferring the axial force to the bearing.

Optionally, the toolkit further comprises a contact ring 22 configured to be interposed axially between the driving tube 16 and the side face of the bearing inner ring 2 that will receive the driving force from the piston 15. In a preferred embodiment of the invention, the contact ring 22 is made from AISI 4140 alloy steel.

In a preferred embodiment, the contact ring 22 presents, on the side to be engaged with the side face of the bearing inner ring, a tapered portion 23 so as to prevent any contact with a seal or a cage or a rolling element of the bearing.

A method for mounting the bearing 1 to the seating 7 with a toolkit according to the invention will now be described.

When no contact ring is used, the method comprises the several steps (a), (b), (c), (d), (e), (f) and (g) described below.
Step (a): the adapter sleeve 8 is installed on the seating 7. The bearing 1 is then installed on the adapter sleeve 8 so that the tapered inner bore 6 of the bearing inner ring 2 mates with the tapered portion 11 of the adapter sleeve 8.
Step (b): the reaction sleeve 17 is installed on the adapter sleeve 8 by engaging the first threaded portion 18 of the reaction sleeve with the threaded portion 12 of the adapter sleeve 8. The knurled surface 27 of the reaction sleeve 17 helps to improve a user's grip on the reaction sleeve while it is installed in a hand-tight manner in step (b).
Step (c): the driving tube 16 is installed around the reaction sleeve 17 so as to come into contact with the bearing inner ring 2.
Step (d): the hydraulic nut 13 is installed so that its threaded bore 14 is engaged on the second threaded portion 19 of the reaction sleeve 17 until the piston 15 comes into contact with the driving tube 16.
Step (e): a specific pressure is produced inside the hydraulic nut 13 to generate the piston driving force needed to establish the "starting point" (as per the standard drive-up method relating the force to gauge pressure in dependence on the piston surface area). Prior to step (e), the hydraulic pump 24 is connected to the hydraulic nut.
Step (f): a dial indicator installed on the hydraulic nut 13 (like the dial indicator 26 of FIG. 1) is reset, and the hydraulic pump 24 is used to achieve a predetermined displacement of the inner ring (the so-called drive-up distance). Pressure is then released and the hydraulic nut 13, the driving tube 16, and the reaction sleeve 17 are removed.
Step (g): a tab washer (not represented) and a locknut (not represented) are installed on the threaded portion 12 of the adapter sleeve 8 and tightened against the side face of the bearing inner ring 2 to lock the position of the bearing 1 on the seating 7.
When the contact ring is used, the method for mounting the bearing to the seating comprises the different steps (a'), (b'), (c'), (d), (e), (f') and (g) described below.
Step (a'): the adapter sleeve 8 is installed on the seating 7. The bearing 1 is then installed on the adapter sleeve 8 so that the tapered bore 6 of the bearing inner ring 2 mates with the tapered portion 11 of the adapter sleeve 8, and the contact ring 22 is positioned against the bearing inner ring 2.
Step (b'): the reaction sleeve 17 is installed by engaging its first threaded portion 18 on the threaded portion 12 of the adapter sleeve 8, all the way to firm contact with the contact ring 22. Preferably, the reaction sleeve is made hand-tight in step (b) with the help of the knurled surface 27 of the reaction sleeve 17.
Step (c'): the driving tube 16 is installed around the reaction sleeve 17 so that it comes into contact with the contact ring 22.
Step (d): the hydraulic nut 13 is installed so that its threaded bore 14 is engaged on the second threaded portion 19 of the reaction sleeve 17 until the piston 15 comes into contact with the driving tube 16.
Step (e): a specific pressure is built inside the hydraulic nut 13 to generate the piston driving force needed to establish the "starting point" (as per the standard drive-up method relating the force to gauge pressure in dependence on the piston surface area). Prior to step (e), the hydraulic pump is connected to the hydraulic nut.
Step (f'): a dial indicator installed on the hydraulic nut is reset, and the hydraulic pump is used to achieve a predetermined displacement of the inner ring (the so-called drive-up distance). Pressure is then released and the hydraulic nut 13, the driving tube 16, the reaction sleeve 17 and the contact ring 22 are removed.

Step (g): a tab washer (not represented) and a locknut (not represented) are installed on the threaded portion 12 of the adapter sleeve 8 and tightened against the side face of the bearing inner ring 2 so as to lock the position of the bearing 1 on the seating 7.

The choice whether or not to use the contact ring 22 for the mounting of the bearing depends on the configuration and dimensions of the bearing and the seating. The specific pressure build inside the hydraulic nut is pre-determined for the bearing to be mounted and can vary from one bearing type or size to another. This specific pressure enables an accurate positioning of the bearing from a starting point, from which the axial drive-up is measured.

By controlling the axial drive-up during the mounting of the bearing, an appropriate fit on the seating is achieved. Thanks to the invention, bearings can be mounted optimally, that is with, for instance, a 0.45% % (0.045%) clearance reduction inside the bearing.

The components of the toolkit are found fail-safe and their presence (being additional elastic members) results in negligible additive elastic deformation which does not affect the standard drive-up distance calculated by known software relevant to direct contact between the hydraulic nut piston and the bearing inner ring.

The method described above is advantageously used to replace "in situ" a bearing located in a housing with a side face represented by the line L on FIG. 2. In this case, the bearing, the adapter sleeve and the housing base will have to slid to position together, with the shaft jacked up slightly above its nominal height.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved methods and devices for mounting a bearing on a seating.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE CHARACTER LIST

1 bearing
2 inner ring
3 outer ring

4 rolling elements
5 cage
6 tapered bore
7 seating
8 adapter sleeve
9 cylindrical bore
10 cylindrical surface
11 tapered portion
12 threaded portion
13 hydraulic nut
14 threaded bore
15 piston
16 driving tube
17 reaction sleeve
18 first threaded portion
19 second threaded portion
20 cylindrical bore
21 cylindrical surface
22 contact ring
23 tapered portion
24 hydraulic pump
25 pressure gauge
26 dial indicator
27 knurled surface
L side face of housing

What is claimed is:

1. A toolkit for mounting a bearing having an inner ring having a tapered bore onto a seating, the toolkit comprising:
   an adapter sleeve configured to be radially interposed between the inner ring and the seating, the adapter sleeve comprising an outer periphery having a tapered portion configured to mate with the tapered bore of the inner ring and a threaded portion configured to extend axially away from the bearing,
   a hydraulic nut having a threaded bore and an axially moveable piston configured to apply an axial force on a side face of the inner ring of the bearing,
   a hydraulic pump configured to increase a hydraulic pressure inside the hydraulic nut,
   a driving tube configured to be interposed axially between the side face of the inner ring of the bearing and the piston, and
   a reaction sleeve configured to be interposed between the hydraulic nut and the adapter sleeve, the reaction sleeve including a first threaded portion configured to engage the threaded portion of the adapter sleeve and a second threaded portion configured to engage the threaded bore of the hydraulic nut.

2. The toolkit according to claim 1, wherein the driving tube and the reaction sleeve comprise AISI 4140 alloy steel.

3. The toolkit according to claim 1, wherein the reaction sleeve has a knurled surface located axially between the first threaded portion and the second threaded portion.

4. The toolkit according to claim 1, further comprising a contact ring configured to be interposed axially between the driving tube and the side face of the bearing inner ring.

5. The toolkit according to claim 4, wherein the contact ring has, on a side configured to be engaged with the side face of the inner ring of the bearing, a tapered portion for preventing contact with a seal or a cage or a rolling element of the bearing.

6. The toolkit according to claim 4, wherein the contact ring is made from AISI 4140 alloy steel.

7. A method comprising:

providing a toolkit according to claim 1, installing the adapter sleeve on the seating, installing the bearing on the adapter sleeve with the tapered bore of the inner ring of the bearing inner ring on the tapered portion of the adapter sleeve, screwing the first threaded portion of the reaction sleeve onto the threaded portion of the adapter sleeve, installing the driving tube around the reaction sleeve with a first axial end of the driving tube facing the side face of the inner ring, screwing the threaded bore of the hydraulic nut onto the second threaded portion of the reaction sleeve so that the piston contacts the driving tube, using the hydraulic pump to produce a first predetermined pressure inside the hydraulic nut to move the nut to a starting position, resetting a pressure indicator operably connected to the hydraulic nut, using the hydraulic pump to move the piston and the driving tube to achieve a predetermined displacement of the inner ring, releasing pressure in the hydraulic nut, removing the driving tube and the reaction sleeve, and locking the position of the bearing on the seating.

8. The method according to claim 7, including placing a contact ring between the first axial end of the driving tube and the side face of the inner ring.

9. A system comprising:

the toolkit according to claim 1, the bearing, and the seating, wherein the adapter sleeve is installed on the seating, wherein the tapered inner bore of the inner ring of the bearing is mounted on the tapered portion of the adapter sleeve, wherein the first threaded portion of the reaction sleeve is screwed onto the threaded portion of the adapter sleeve, wherein the driving tube is installed around the reaction sleeve with a first axial end of the driving tube facing the side face of the inner ring, wherein the threaded bore of the hydraulic nut is screwed onto the second threaded portion of the reaction sleeve, and wherein the piston contacts the driving tube.

10. The system according to claim 9, wherein the driving tube directly contacts the inner ring of the bearing.

11. The system according to claim 9, including a contact ring between the driving tube and the inner ring of the bearing, a first axial end of the contact ring contacting the driving tube and a second axial end of the contact ring contacting the inner ring of the bearing.

* * * * *